F. W. STEWART.
SHAFT CONNECTING SWIVEL AND GEARING.
APPLICATION FILED JUNE 14, 1919.
1,427,652.
Patented Aug. 29, 1922.
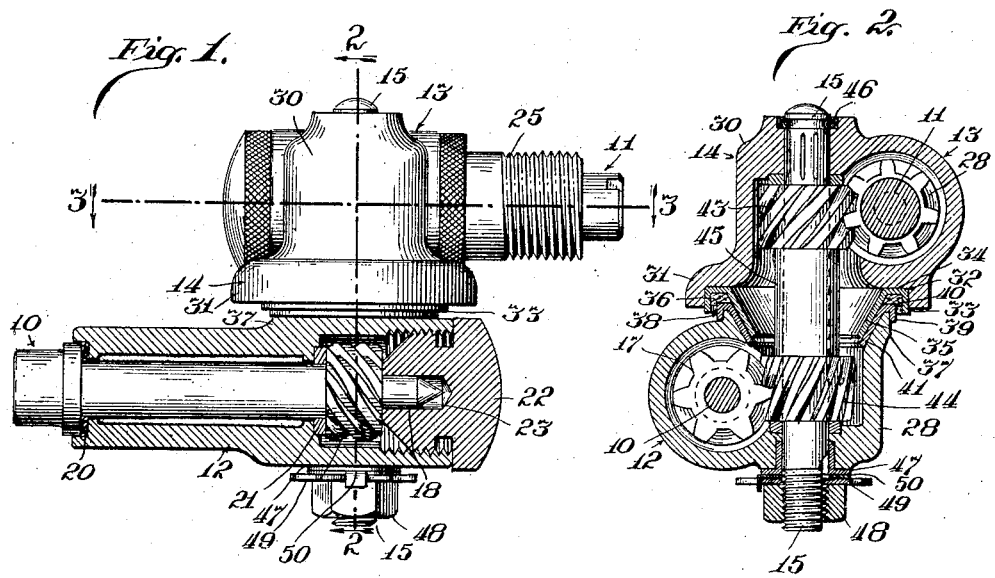
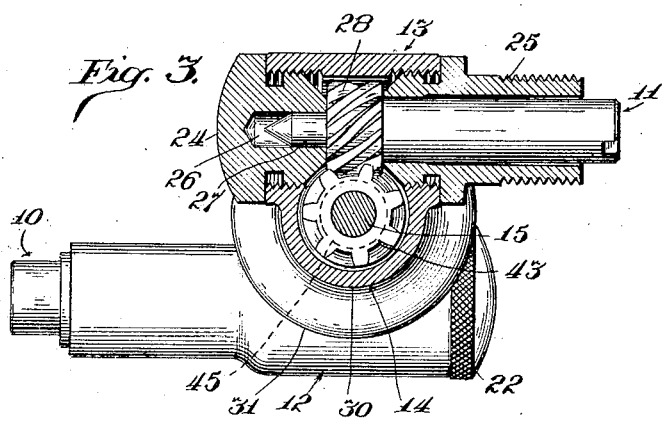
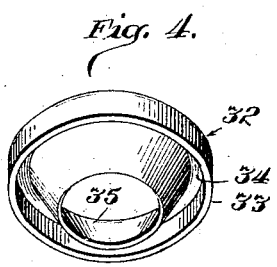
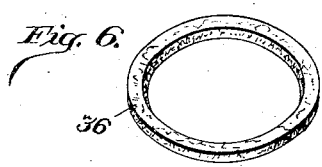
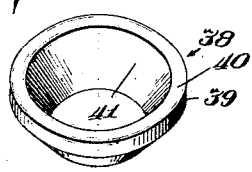
Inventor
Franklin W. Stewart.
By Rector Hibben Davis & Macauley
Attorneys.

UNITED STATES PATENT OFFICE.

FRANKLIN W. STEWART, OF CHICAGO, ILLINOIS.

SHAFT-CONNECTING SWIVEL AND GEARING.

1,427,652.  Specification of Letters Patent.  Patented Aug. 29, 1922.

Application filed June 14, 1919. Serial No. 304,086.

*To all whom it may concern:*

Be it known that I, FRANKLIN W. STEWART, a citizen of the United States, residing at Chicago, in the county of Cook and State of Illinois, have invented certain new and useful Improvements in Shaft-Connecting Swivels and Gearing, of which the following is a specification.

My invention relates to a shaft-connecting swivel and gearing, adapted for use in connection with automobile speedometers, and otherwise. Its general object is to provide a swivel combining mechanical efficiency, durability, ruggedness, and manufacturing ease, with other advantages. To these ends it consists in the combinations, constructions, and arrangement of parts hereinafter set forth and particularly claimed, reference being had to the accompanying drawings wherein:

Fig. 1 is a side elevation with parts in section showing the swivel connection in design particularly intended for use with an automobile speedometer; Fig. 2 is a section on line 2—2 of Fig. 1; Fig. 3 is a section on line 3—3 of Fig. 1; and Figs. 4, 5 and 6 are details of bearing parts.

The driving and driven shafts 10 and 11, lying in parallel horizontal planes enter barrels 12 and 13 which are tangential to the respective body-sections of the horizontally-split connecting-shell 14, through which there extends the intermediate shaft 15 and the reduction-gear-connection between the respective driving and driven shafts. The gear connection, as is usual in this class of devices, maintains operative relation between the driving and driven shafts to whatever angular relation the driving and driven shafts may be turned by the swiveling of the two shell sections.

The drive shaft 10 carries worm wheel 17 and beyond said gear has a reduced bearing-extension 18, the soft metal barrel, generally of brass, affording for the shaft a long bearing protected at its outer end by a suitable grit and water resisting washer 20 of felt and being re-inforced by a hard bearing washer 21 close to the gear. The gear-receiving enlargement of the barrel is closed at its end by a steel nut 22 threaded into the barrel enlargement and provided with a recess 23 to receive the slender bearing extension 18 of the shaft. Perfect alignment, minimization of bearing-wear and gear-wear and consequent liability to play or noise, as well as accessibility, ease of lubrication and protection against dust and water are secured by this construction, and these advantages also characterize the construction of the driven shaft mounting and the intermediate swiveling connection, to be described.

The driven shaft barrel 13 has both its ends threaded to receive, interchangeably, a head 24 and a collar 25, the former recessed as at 26 to receive the reduced bearing extension 27 of driven shaft 11, while the sleeve affords the main bearing for the shaft, as shown. Beveled gear 28 on shaft 11 is thus very accurately positioned and maintained, and the shaft is reversible for right- and left-hand installations, the gear 28 occupying the same space in either position.

The swiveling body 14 of the shell is usually subject to considerable turning action and it is highly important that its wear be minimized and that its parts be held always in proper vertical register. Adjacent the plane of their connection I enlarge both the lower and upper sections 29 and 30, of the shell and give them large, steel-lined bearing surfaces. In the particular construction shown and preferred, the upper body member 29 has its enlarged belt or flange, 31, recessed and in the recess is seated a steel bearing ring 32 having a flange 33, a bottom 34 and cone 35, the latter projecting downwardly. This element may best be formed of a single piece as by stamping it from sheet metal. A protecting washer, 36, preferably of felt, is fitted against the bottom 34. The opposing enlargement 37 of the shell-bottom 28 is preferably of smaller diameter than flange 33 of the first-mentioned bearing member, and its upper end is sheathed with a bearing member 38 having a rim portion 39, and end 40 and a cone 41. These coacting steel bearing parts may be drive-fitted or otherwise rigidly attached to the softer material of the shell and their cones nest accurately, the upper flange 31 over-hanging the edge of the lower cone-member as a drip-shield. The two conical surfaces give a very large, accurate and self-centering bearing, amply protected against dust and water by the washer 36, and having both lateral and vertical bearing contact for maintaining perfect alignment.

The two beveled gears 43 and 44 meshing with the respective driven and driving gears 28 and 17 are connected by a sleeve 45, and rotate together about the fixed shaft 15 which is mounted in the housing and secures the swiveled halves thereof together. The upper longitudinally scored end of the shaft is driven into the shell and fixed against vertical movement by a snap ring 46; its threaded lower end, passing through a reinforcing collar 47 driven in the lower end of the shell and receiving the nut 48. The nut may be held by a lock washer 49 and preferably bears upon a spring washer 50 which is capable of taking up any slight vertical play between the shell sections, which otherwise might occur due to wear. This spring washer, however, is not always necessary in practice.

It will be observed that with the construction described I provide a swivel joint of greatest durability and efficiency, the gearing, (which may be made for any desired speed-relation or differentiation between the two shafts) having their spiral pairs most accurately retained in mesh and most adequately supported against all wear-engendering side-strains and end-thrusts, and a highly important, and ordinarily a most vulnerable point of the construction,—the swivel joint,—being especially fortified, given very large bearing surfaces without undue enlargement of the construction, and made substantially self-centering and self-tightening.

While I have herein described in some detail a particular embodiment of my invention, it will be apparent to those skilled in the art that changes in details might be made without departure from the spirit of my invention within the scope of the appended claims.

What I claim is:

1. In a swivel joint for geared shafting, the combination of meeting shell sections each having a barrel, driving and driven shafts mounted in the shaft-barrels and connections including a shaft extending through and retaining the meeting shell sections, said shell sections having enlarged plain bearing surfaces interfitting on lines angular to the axis of the shell to tend to grind together, and prevent both endwise and sidewise nonfitting, under wear.

2. In a swivel connection for shafts, the combination of a pair of shaft barrels, each having a main shaft receptive bearing portion and an end closure provided with a bearing recess, a shaft in each of said barrels having a gear between its ends and a main bearing portion and an end-bearing portion beyond said gear said end bearing portion being journaled in the closure-recess, a connecting shaft, gearing positioned by said connecting shaft and meshing with the gears of the first named shafts, and a two-part shell body, each part carrying one of said barrels, said body part having confronting enlargements for swivel bearing, and wear-members thereon interfitting on lines angular to the axis of the shell.

3. In a swivel connection for shaft members, a shell comprising two transversely-separable, aligning portions, each said portion carrying a barrel, the confronting parts of said aligning portions being enlarged, corresponding wear cones carried by said enlarged portions, and a central member uniting said portions.

4. In a shaft swivel, the combination with the shaft members, barrels therefor, connecting gearing, a two-part body therefor, each part thereof carrying one of said barrels tangentially, nesting wear-members at the meeting portions of said shell sections, one thereof being channeled to receive between it and the opposing member a washer, the washer, and a central shaft connecting the casing-body parts.

5. In a shaft swivel casing, the combination of two body sections having meeting enlargements, wear-linings fitted to said enlargements, one thereof being channeled and receiving the end of the other within its channel, and a connection between said sections.

6. In a swivel joint for geared shafting, the combination of meeting shell sections each having a barrel, driving and driven shafts mounted in the shaft-barrels and connections including a shaft extending through and retaining the meeting shell sections, said shell sections having opposed, enlarged, plain bearing surfaces disposed at an oblique angle to the axis of the connection-shaft and interfitting to give lateral and longitudinal pressure between the surfaces and make the bearing self-centering.

FRANKLIN W. STEWART.